Dec. 23, 1924.

R. C. ELLIOTT

TYPOGRAPHIC COMPOSING MACHINE

Filed Jan. 6, 1923   6 Sheets-Sheet 3

INVENTOR:
Richard Cornelius Elliott,
BY
John A. Ferguson
HIS ATTORNEY.

Dec. 23, 1924.
R. C. ELLIOTT
TYPOGRAPHIC COMPOSING MACHINE
Filed Jan. 6, 1923   6 Sheets-Sheet 4
1,520,632
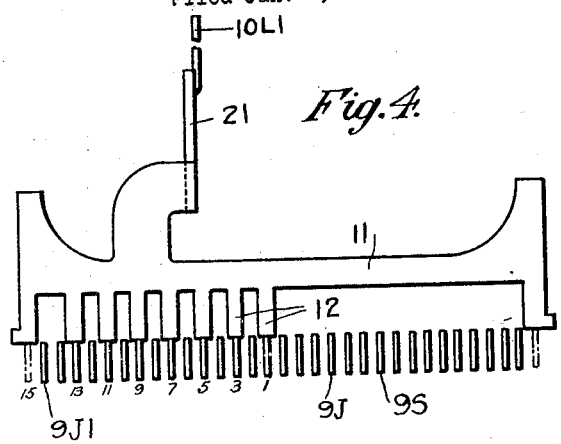
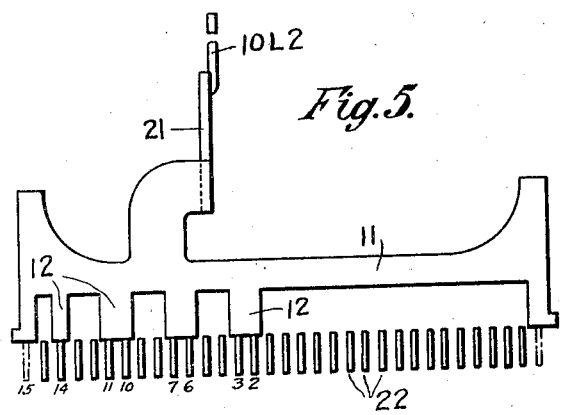
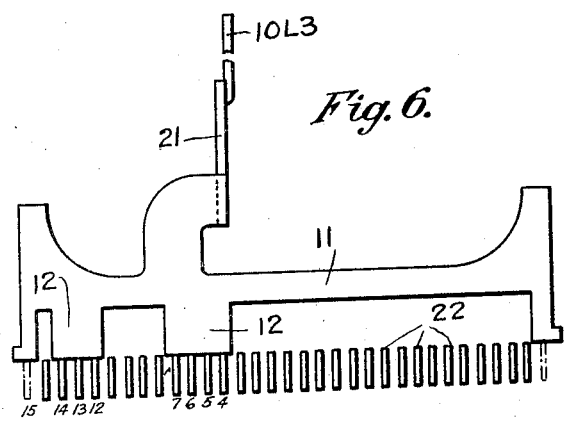
INVENTOR:
Richard Cornelius Elliott,
BY
John A. Ferguson
HIS ATTORNEY.

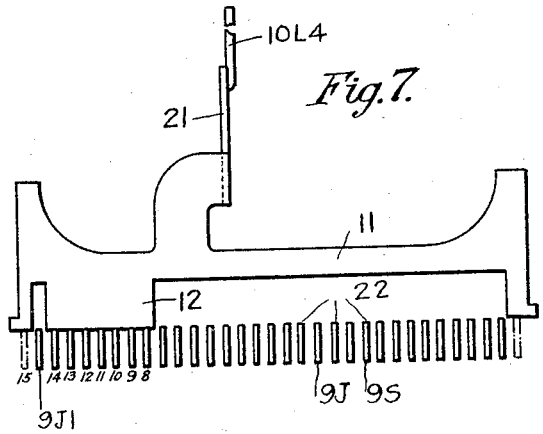
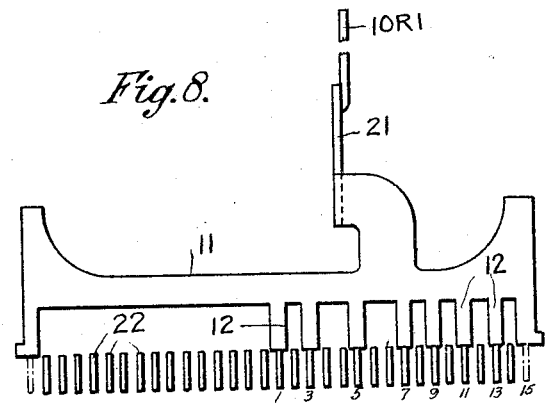
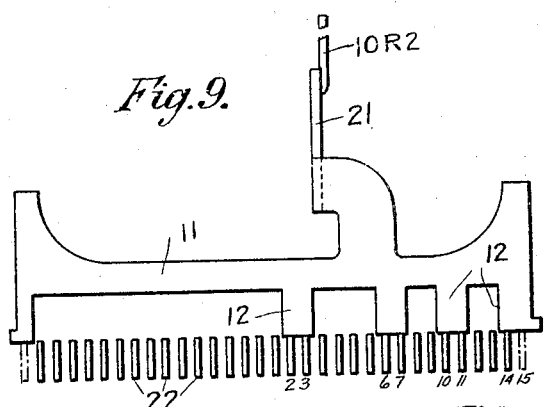

Dec. 23, 1924. 1,520,632
R. C. ELLIOTT
TYPOGRAPHIC COMPOSING MACHINE
Filed Jan. 6, 1923 6 Sheets-Sheet 6

INVENTOR:
Richard Cornelius Elliott,
BY
John A. Ferguson
HIS ATTORNEY.

Patented Dec. 23, 1924.

1,520,632

UNITED STATES PATENT OFFICE.

RICHARD CORNELIUS ELLIOTT, OF PIMLICO, LONDON, ENGLAND, ASSIGNOR TO LANSTON MONOTYPE MACHINE COMPANY, OF PHILADELPHIA, PENNSYLVANIA, A CORPORATION OF VIRGINIA.

TYPOGRAPHIC COMPOSING MACHINE.

Application filed January 6, 1923. Serial No. 611,120.

*To all whom it may concern:*

Be it known, that I, RICHARD CORNELIUS ELLIOTT, a British subject, and a resident of 86 St. George's Square, Pimlico, London, S. W., England, have invented certain new and useful Improvements in Typographic Composing Machines; and I do hereby declare the following to be a full, clear, and exact description of the same, reference being had to the accompanying drawings, forming part of this specification, and to the characters of reference marked thereon.

This invention relates to typographic composing machines in which the depression of a key produces a signal in the form of a perforation or perforations in a continuous strip of paper, the perforations being made by punches or other signal producing devices; the strip after being produced is later utilized to control the operations of an automatic type casting and composing machine.

The keyboard composing machine of the kind referred to is exemplified in the well-known keyboard typographic machine widely known and used as a product of Lanston Monotype Machine Company, and is basically disclosed in United States Letters Patent No. 944,405, dated December 28, 1909.

The automatic machine in which the perforated controller strip is utilized may be the type casting and composing machine such as that basically disclosed in United States Letters Patent No. 625,998, dated May 30, 1899.

The punches in the keyboard machine are disposed in line and the controller strip is of such width as to extend over all the punches. The chief function of the signals or perforations in the strip is to control in the automatic type casting machine, the positioning of a matrix holder or die case in which the matrices are arranged in columns or rows in two directions, so that each complete signal in the record strip controls a two-way movement of the die case.

The punches in the keyboard machine may be conveniently divided into two main designating groups, one group representing successive rows of matrices and therefore successive stages of movement for the die case in one direction, and the other group successive columns of matrices, and therefore successive movements for the die case in a direction at right angles to the first mentioned direction. Thus, when a key is operated, a signal is produced usually comprising two components, one from each group of punches, to designate a particular column of matrices in the die case and a particular matrix in that column.

The principal object of the present invention is to provide mechanism whereby each punch, or the equivalent, signal producing device may be employed to produce components of a greater number of signals than hitherto so that either a record strip of the dimensions hitherto employed can be utilized to perform additional functions or the number of signal producing devices can be greatly reduced and therefore also the dimensions of the record strip.

Further objects will be hereinafter pointed out or will otherwise appear in connection with the following description of the mechanism embodying the invention as shown in the accompanying drawings in which—

Figs. 4 to 14 are detail elevations of the separate interponents and their actuating bars.

Figure 1:
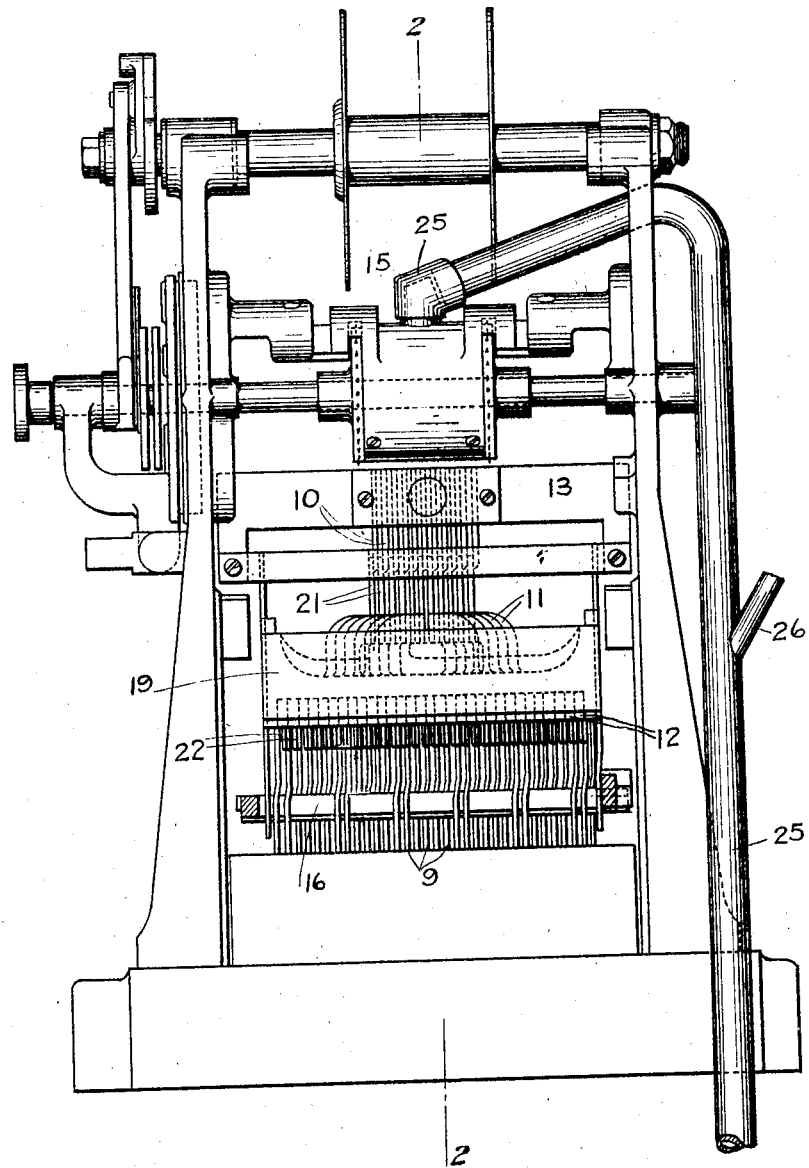
Fig. 1 is a rear elevation of part of a composing machine above referred to and embodying the present invention.

According to the present invention, each punch is operatively connected with one of a series of movable bars, interponents, or the like, which are movable independently of or in conjunction with one another, each by one or more members of a series of actuating bars which are operated separately or in combination under control of the keys of the keyboard.

These movable punch-carrying bars or interponents are each furnished with shoulders or projections arranged in the path of the actuating bars allocated to each punch carrying bar. The shoulders or projections of these interponents are arranged to cooperate with the key-operated actuating bars so that each punch can be operated separately, or in company with any one or more of the punches of the series or all the punches of the series can be operated simultaneously in accordance with the nature of the signal to be given or perforations to be made. Each punch-carrying bar of one series is duplicated in the similar punch-carrying bar of the other series. Each signal may comprise more than two components and may be produced by all the signal-producing devices operating together.

The invention is shown as applied to a machine for preparing a record strip to perform the necessary functions by acting on a series of gages to determine the various positions of adjustment for a die case having two hundred twenty-five matrices, comprising fifteen rows and fifteen columns. The present embodiment of the invention is designed to reduce the dimensions of the record strip from a capacity of thirty-one possible perforation locations to eleven of said locations. The new strip therefore need be only about one-third as wide as the previous strip. It is to be understood that the last row and the last column of the matrix case require no perforations because the casting machine is provided with a permanent stop or gage on one side of the machine for the last row of the case, and a permanent stop or gage on the other side for the last column. A single perforation signal will therefore locate the case somewhere in the last row or the last column, and a no-perforation signal will locate the case at the intersection of the last row and the last column.

It is not considered necessary to refer herein in detail to the particular composing machine in which the invention is shown as full particulars thereof are well-known to those skilled in the art and may be obtained by reference to the keyboard patent above referred to. It will be sufficient for the purposes of this invention to refer only to the parts of the existing machine which cooperate directly with the mechanism of the present invention.

Reference may be made to the key 1 (Fig. 2) by the depression of which the bars 2 and a valve 3 are operated in the usual fashion to cause air under pressure in the chamber 4 to operate a motor piston 5 connected by a rod 6 to a bar 7 pivoted at 8, the bar 7 being operatively connected with the punch bars of the machine. It will be understood that the depression of a key will operate a valve to permit air under pressure to operate a motor 5 and from it a punch bar, and in the commercial, patented machine, a punch bar will operate a punch because the punch is directly attached to said punch bar. A key will, generally speaking, operate two punches, one representing a matrix case row, and the other a matrix case column.

A justification space signal is produced in the same manner as the matrix location signals above referred to, except that there is provided for one component a special punch called the space or S punch, and for the other component a punch for positioning the matrix case for the casting of this space. The second component of this signal, when it reaches the caster, controls the matrix case to bring it to the proper row, while the S component or perforation operates a special motor and associated mechanism for causing the cast to be made with the aid of the normal wedge of the machine in combination with the justification wedges of which there are two.

The justification signal is double in that it requires the depression of two justification keys as indicated by the justification scale or drum. The signal produced by the first justification key is composed of two components, one of which operates mechanism in the caster to pick out one of the two justification wedges, and the other of which indicates the position to which the matrix case is to be moved, and, since the selected justification wedge is operated by the matrix case this second component of the first justification signal causes the proper positioning of the selected justification wedge.

In the present invention the actuating bars 9 take the place of the normal punch bars and are connected at their lower ends to the levers 7.

There are thirty-three actuating bars 9, two of which control the two justification punches and a third, the justifiable space punch: two bars carry no punches and of the remainder twenty-eight control the character or symbol punches and are divided, as stated, into two groups of fourteen, while one bar at each end, that denoting one of the extreme positions, does not require a punch, as when no perforation is present in the record strip the die case moves to its extreme position.

According to the present invention it is only necessary to have four punches in each designating group for controlling the movements of the die case in both directions. The three punches for justification purposes remain as hitherto. In the machine as hitherto constructed each complete signal, with the exceptions above indicated, comprises two components, one from each group, whereas according to the present invention a complete signal may comprise one or more components from each group, or all of the components of both groups.

The punches 10 are connected each to an interponent 11 and the interponents 11 are selectively actuated by the bars 9 in such a way that each bar 9 can operate more than one interponent 11, and each punch 10 can be actuated by more than one bar 9. The selective operation is accomplished by the provision of shoulders or projections 12 on the interponents 11, the actuating bars 10 engaging with these selectively arranged shoulders. These shoulders are arranged so that certain actuating bars 9 operate only one interponent while others operate two or more interponents simultaneously.

The punches 10 have their lower ends bent over to enter openings in the bars 11 and are as hitherto, supported in a guide bar 13 which is conveniently formed in two parts which can be separated to allow a punch to be changed or the openings in the guide bar to be cleaned. Above the guide bar 13 is a die block 14 carried by a cylindrical member 15 and the record strip to be perforated or composed passes between the bar 13 and the die block 14.

The actuating bars 9 are grouped as hitherto on opposite side of a universal bar 16 (Fig. 2) each bar 9 being furnished with a shoulder 17 to engage the bar 16. This bar 16 is controlled by a motor 18 and serves to return the actuating bars to their initial position.

Figure 2:
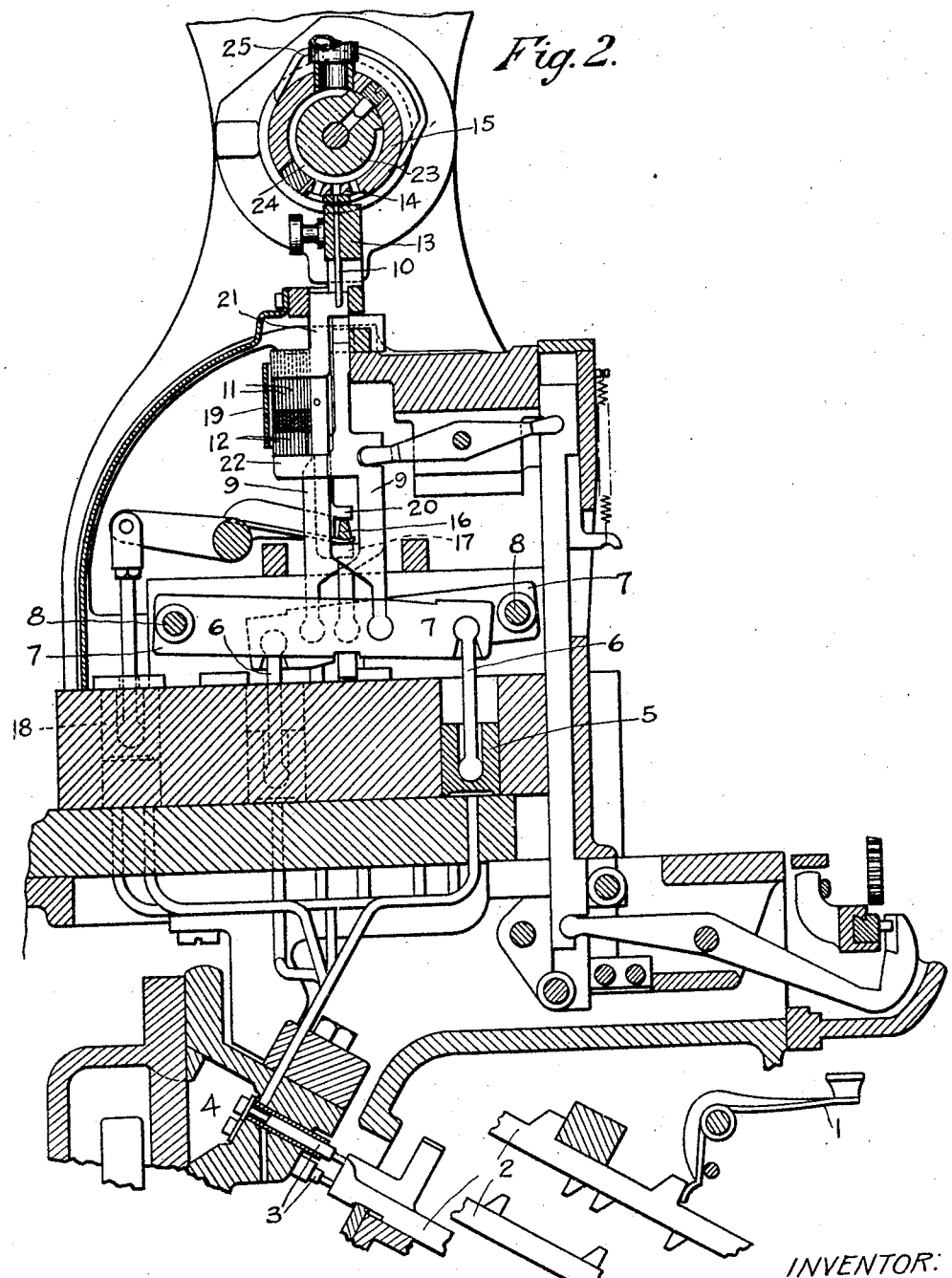
Fig. 2 is a sectional elevation on approximately line 2—2 of Fig. 1.
Figure 3:
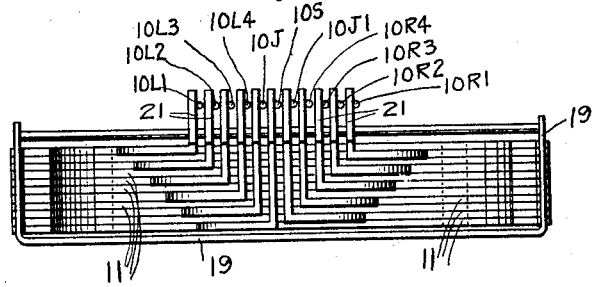
Fig. 3 is a plan showing the punches and interponents.
Figure 13:
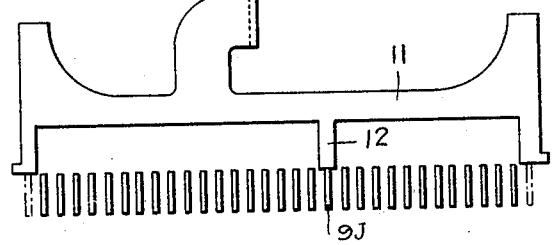

The interponents 11 are in the form of bars which are grouped together side by side in a supporting frame or cage 19 which is operatively connected by an extension 20 to the universal bar 16 so that the frame moves up and down in company with the interponents 11 when they are operated. Each of the interponents 11 is provided with an extension 21 to which a punch 10 is coupled (Figs. 2 and 3). Each interponent 11 is also furnished, as previously stated, with projections 12 selectively disposed and adapted to be engaged by projections 22 on the actuating bars 9. The projections 22 on the bars 9 and the extensions 12 on the interponents are arranged to give prearranged combinations and permutations and can be arranged in accordance with any desired scheme to operate the punches in the required combinations.

The two extreme bars 9 of each group, which as above stated, do not actuate punches, are not provided with projections 22 and as they do not differ from the existing machine they are indicated on the annexed drawings in broken lines. (Figs. 4–14).

Figure 14:
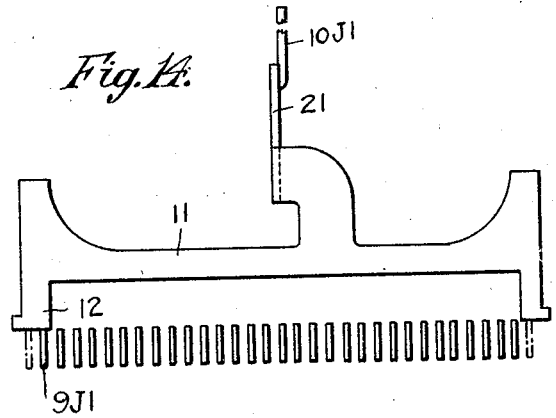
Figure 10:
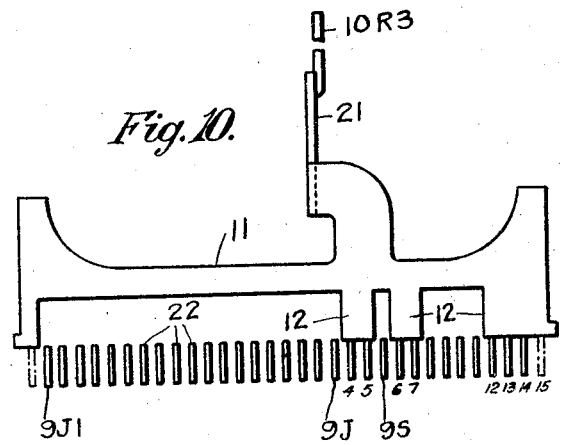
Figure 11:
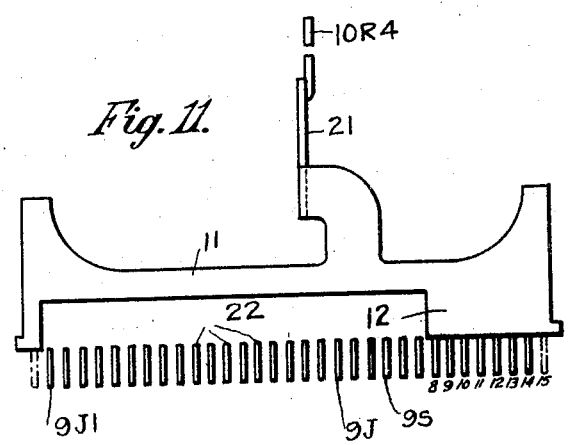
Figure 12:
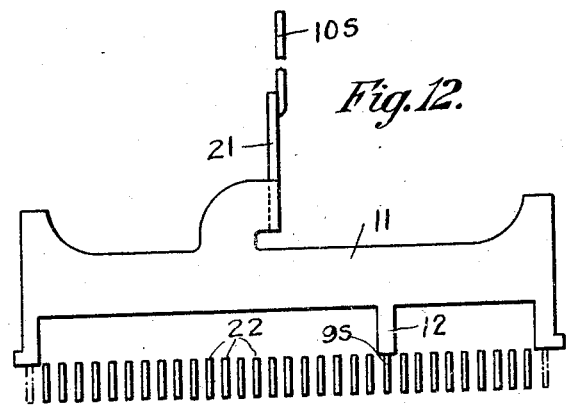

As above stated there are, in the casting machine to be controlled by the strip perforated on the present machine, two series of stops and the punches in the machine now being described are divided into two groups each producing perforations for controlling a series of these stops. There are four punches in each group and in addition, the two justification punches $10^J$ and $10^{J'}$ (Figs. 1, 3, 13 and 14) and the justifiable space $10^S$ (Figs. 1, 3 and 12). The interponent $11^J$ for controlling the justification punch $10^J$ has only one projection 12 which is operated by the actuating bar $9^J$ (Fig. 13) and the interponent $11^{J'}$ for controlling the other justification punch $10^{J'}$ has one projection 12 which is engaged only by the actuating bar $9^{J'}$ (Fig. 14). Likewise the interponent $11^S$ for the justifiable space punch has a projection 12 which is only engaged by the actuating bar $9^S$ (Fig. 12).

Referring now to the two main groups or character punches which control die case positioning perforations, four punches only are required for each group and each punch is operated by a number of actuating bars 9 through the interponents 11, for example: The interponent 11 of the punch $10^{L1}$ of the left group, as shown in drawings (Fig. 4) has projections 12 which can be engaged and the interponent elevated by the bars 1, 3, 5, 7, 9, 11 and 13 of the left group of actuating bars 9.

The interponent 11 of the punch $10^{L2}$ (Fig. 5) has projections 12 which can be engaged and the interponent elevated by bars numbered 2, 3, 6, 7, 10, 11 and 14 of the left group of actuating bars 9.

The interponent 11 of punch $10^{L3}$ (Fig. 6) has projections 12 which can be engaged and the interponent elevated by bars numbered 4, 5, 6, 7, 12, 13 and 14 of the left group of bars.

The interponent 11 of punch $10^{L4}$ (Fig. 7) has projections 12 which can be engaged and the interponent elevated by bars numbered 8, 9, 10, 11, 12, 13 and 14 of the left group of bars.

Similarly with the punches of the right hand group the interponent 11 of punch $10^{R1}$ (Fig. 8) has projections 12 which can be engaged and the interponent elevated by actuating bars numbered 1, 3, 5, 7, 9, 11 and 13 of the right hand group of actuating bars 9.

The interponent 11 of the punch $10^{R2}$ (Fig. 9) has projections 12 which can be engaged and the interponent elevated by actuating bars numbered 2, 3, 6, 7, 10, 11 and 14 of the right hand group of actuating bars. 9.

The interponent 11 of punch $10^{R3}$ (Fig. 10) has projections 12 which can be engaged and the interponent elevated by bars numbered 4, 5, 6, 7, 12, 13 and 14 of the right hand group of actuating bars 9.

The interponent 11 of the punch $10^{R4}$ (Fig. 11) has projections which can be engaged and the interponent elevated by bars numbered 8, 9, 10, 11, 12, 13 and 14 of the right hand group of actuating bars 9.

The interponent 11 of the justifiable space indicating punch $10^S$ (Fig. 12) has only one projection 12 which is engaged by the actuating bar $9^S$.

The interponent 11 of one of the justification punches 10$^J$ (Fig. 13) has likewise only one projection 12 which is engaged by the actuating bar 9$^J$ and also the interponent 11 of the other justification punch 10$^{J1}$ (Fig. 14), has one projection which is engaged by the actuating bar 9$^{J1}$.

The above indicated combinations are sufficient to produce signals for the positioning of two hundred twenty-five matrices and in conjunction with the justification punches the requisite justification signals but they do not exhaust the combinations possible with the mechanism and if either or both of the actuating bars which, as stated above, are employed to elevate certain interponents, two hundred fifty-six matrices can be dealt with: For example, the actuating bar at the left hand side may be made to engage with projections 12 on all the interponents of punches of the left hand group and similarly the actuating bar at the extreme right hand may be made to engage with all the interponents of the punches in the right hand group.

For convenience in removing the particles of paper which are punched from the record strip by the punches, and also any paper dust that may be produced the cylindrical member 15 has a central core 23 between which and the outer casing is a chamber 24 in which the particles and dust are deposited.

At the top of this casing is fitted a pipe 25 into which an air injecting pipe 26 is led and the current of air admitted to this pipe 25 tends to form a vacuum in the chamber. Air enters the chamber through the openings in the die bar 14 and the particles and dust are thus drawn off. A forced current of air may be introduced into the chamber to blow the particles and dust out through the pipe 25.

The invention has been described as embodied in a machine of known construction, and to the reduction of the number of signal producing devices required and therefore the dimensions of the record strip. It can, however, be employed to produce signals in a record strip of larger dimensions and to provide signals performing other functions than those above referred to. The invention is also not restricted to any particular machine nor is it to be restricted in application to the production of a particular form of record strip applicable to only one kind of automatic type casting machine.

I claim:

1. A keyboard composing machine comprising a series of motor driven bars operated by the depression of keys, a series of individually slidable members said members being less in number than said bars and being, provided selectively with projections, a punch secured to each member, said projections being adapted to contact with said bars, whereby the bars operate selectively the punches.

2. A keyboard perforating machine comprising a series of bars operated under the control of keys, each of said bars having an extension, a series of punch bars less in number than said first mentioned bars and being provided selectively with projections for engagement with said extensions and punches secured to said punch bars whereby the operation of a key controlled bar selectively causes operation of one or more punch bars and punches.

3. A keyboard perforating machine comprising a series of bars operated under the control of keys, each of said bars having an extension, a universal bar operated from said key controlled bars, a cage operated by said universal bar, a series of punch bars nested in said cage, and a punch secured to each punch bar, said punch bars being provided selectively with projections for engagement with said extensions whereby the operation of a key controlled bar selectively causes operation of one or more punch bars and punches.

4. A keyboard composing machine having character designating keys and punches for recording the characters designated, characterized by the provision of four punches capable of recording the designations of fifteen characters, and means comprising bars operated by the depression of the keys each of said bars having an extension, and a series of individually slidable members to which the punches are secured, said members being provided selectively with projections adapted to contact with said extensions, said means effecting the operation of the members and punches from the keys, selectively singly or in combination with one or more of the others to produce the desired individual record for each character.

5. A keyboard composing machine having character designating keys and punches for recording the characters designated, characterized by the provision of eight punches, capable of recording the designations of two hundred and twenty five characters, and means comprising bars operated by the depression of keys, each of said bars having an extension, and a series of individually slidable members to which the punches are secured, said members being provided selectively with projections adapted to contact with said extensions, said means effecting the operation of the members and punches from the keys, selectively singly or in combination with one or more of the others to produce the desired individual record for each character.

RICHARD CORNELIUS ELLIOTT.